(No Model.)

T. POWELL.
SAW FILING MACHINE.

No. 434,071. Patented Aug. 12, 1890.

Witnesses
Chas H. Durand
Wm. Bagger

Inventor
Thomas Powell.
By his Attorneys,
C. A. Snow & Co.

UNITED STATES PATENT OFFICE.

THOMAS POWELL, OF GUTHRIE, KENTUCKY.

SAW-FILING MACHINE.

SPECIFICATION forming part of Letters Patent No. 434,071, dated August 12, 1890.

Application filed May 13, 1890. Serial No. 351,604. (No model.)

*To all whom it may concern:*

Be it known that I, THOMAS POWELL, a citizen of the United States, residing at Guthrie, in the county of Todd and State of Kentucky, have invented a new and useful Saw-Filing Machine, of which the following is a specification.

This invention relates to saw-filing machines; and it has for its object to construct a device of this class which will be simple and easily operated and by means of which the teeth of circular saws may be filed in a true and uniform manner.

The invention consists in the improved construction and arrangement of parts, which will be hereinafter described, and particularly pointed out in the claims.

Figure 1:
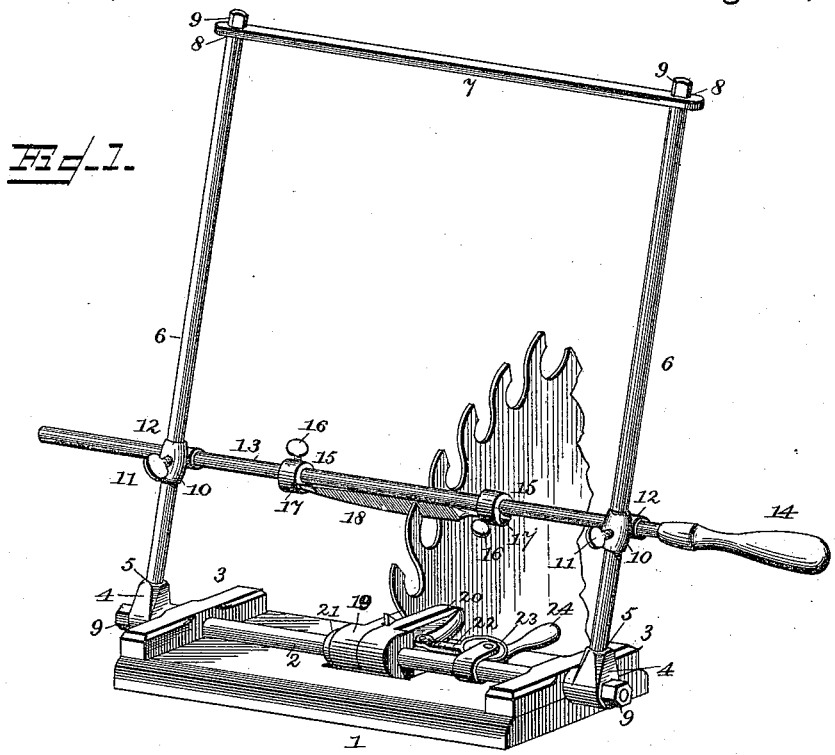
Figure 2:
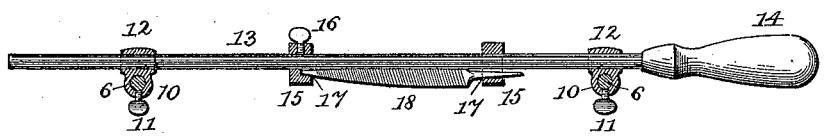
Figure 3:
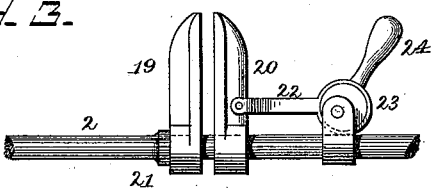

In the drawings hereto annexed, Figure 1 is a perspective view showing my improved saw-filing machine in position for operation. Fig. 2 is a sectional view taken longitudinally through the file-holder. Fig. 3 is a detail view of the saw-clamp.

Like numerals of reference indicate like parts in all the figures.

1 designates a bench or table provided with bearings for a shaft 2, which is provided near its ends with collars 3. Journaled upon the ends of the shaft adjacent to said collars are the bushings 4, having sockets 5, in which are mounted a pair of parallel arms 6, the outer ends of which are connected by a brace 7, which latter is provided with perforations 8 to fit over the reduced screw-threaded ends of the arms 6, upon which the said brace is secured by means of nuts 9. The bushings 4 are secured upon the ends of the shaft 2 by means of nuts 9 in such a manner that the said bushings may rotate freely upon the ends of the shaft. The brace 7 is to be of such length that the arms 6 6 shall be held parallel to each other.

Upon each of the arms 6 is mounted a tubular slide 10, having a thumb-screw 11, by means of which it may be secured at any desired adjustment. Each of the tubular slides 10 is provided at right angles thereto with a tubular guide 12 to receive the rod 13, which constitutes the file-holder, and which is provided at one end with a handle 14, by means of which it may be conveniently manipulated. The rod 13 is provided between the arms 6 with two collars 15, provided with set-screws 16, and provided in their adjacent faces with notches or recesses 17, adapted to receive, respectively, the tang and the point of an ordinary file 18, which latter may thus be clamped securely upon the rod 13 in such a manner as to be capable of being operated by the reciprocation of the rod or holder 13 in the tubular guide-sleeves 12. The shaft 2 is provided with a pair of clamping-jaws 19 and 20, the former of which abuts against a collar 21 formed upon the said shaft, while the jaw 20 is arranged to slide upon the latter. The said jaw 20 is connected by a link 22 with a cam or eccentric 23, having an operating lever or handle 24, whereby it may be operated to move the clamping-jaw 20 toward or from the jaw 19, as may be desired. The clamping-jaw projects slightly over the edge of the bench or table 1 and the latter may be provided with a notch to admit the teeth of the saw.

In operation the circular saw which is to be filed is mounted upon a suitable arbor in such a manner that its teeth shall pass successively between the clamping-jaws. The clamping-jaw 20 may be readily manipulated, so as to permit the saw to be adjusted and to retain it securely at any desired adjustment while it is being operated upon by the file. The file-carrying frame may be swung back so as to hold the file out of the way while the saw is being adjusted to place the next tooth in position for being filed. The slides carrying the file-holder may be readily adjusted at any desired position upon the arms 6, according to the size of the saw which is to be filed, and it will be readily seen that by my invention the inner and outer sides of the points of the saw-teeth may be equally well and easily filed. The file-holder being guided with perfect accuracy causes the saw-teeth to be filed evenly, and the file being held at right angles to the saw avoids all danger of filing the points slantingly.

By this invention expert or skilled labor for filing the saws may be dispensed with, and the danger of injuring the temper of the saws, which is oftentimes incurred when emery-wheels are used for sharpening, is avoided.

My improved saw-filing machine, as will be seen from the foregoing description, is exceedingly simple in construction, and it may be manufactured at a moderate expense, thus making it available for mill-owners who do not have occasion to use the more expensive and complicated sharpening-machines which require to be driven by steam or other power.

My improved machine when not in use may be readily taken apart and packed in a small space.

Having thus described my invention, what I claim is—

1. In a saw-sharpening machine, the combination of a shaft, a frame mounted pivotally upon the said shaft and comprising a pair of parallel arms and a brace connecting the outer ends of said arms, the slides mounted adjustably upon said arms and having guide-sleeves, the rod or file-holder mounted to reciprocate in said guide-sleeves, and the clamping-jaws mounted upon the shaft, substantially as and for the purpose set forth.

2. The combination of the shaft having collars near its ends, the bushings mounted upon said shafts adjacent to the collars thereof and having sockets, and the arms mounted in said sockets, the brace connecting the outer ends of said arms, the slides mounted adjustably upon said arms and having guide-sleeves at right angles thereto, the rod or file-holder mounted to reciprocate in said guide-sleeves, the collars secured adjustably upon said rod by means of set-screws and having notches to receive the file, and the clamping-jaws mounted upon the shaft, substantially as set forth.

3. In a saw-sharpening machine, the combination, with a shaft having a pivoted frame provided with adjustable bearings for a reciprocating file-carrier, of a collar or flange formed upon said shaft, a clamping-jaw abutting against said flange, a sliding clamping-jaw, a cam or eccentric having an operating-lever, and a link connecting said clamp with the sliding clamping-jaw, substantially as herein set forth.

4. The combination of a suitable bench or table, a shaft mounted in suitable bearings in said bench, a frame connected pivotally to said shaft and provided with adjustable bearings for a reciprocating file-carrier, the clamping-jaws mounted upon the shaft adjacent to a collar or flange upon the latter, a cam or eccentric connected pivotally to the shaft and having an operating-lever, and a link connecting said clamp with one of the clamping-jaws, substantially as and for the purpose set forth.

5. In a saw-sharpener, the combination of a shaft, a frame mounted pivotally upon the same, the slides mounted adjustably upon the side arms of said frame, and the file-holder mounted to reciprocate in the slides, as set forth.

6. In a saw-sharpener, the combination of a shaft having the clamping-jaws for the saw, a frame mounted pivotally upon the same, the slides mounted adjustably upon the side arms of said frame, and the file-holder mounted to reciprocate in the slides, as set forth.

In testimony that I claim the foregoing as my own I have hereto affixed my signature in presence of two witnesses.

THOS. POWELL.

Witnesses:
E. S. FRANKLIN,
L. H. AYRES.